US010761670B2

(12) United States Patent
Moseley

(10) Patent No.: US 10,761,670 B2
(45) Date of Patent: Sep. 1, 2020

(54) SENSING OF MULTIPLE WRITING INSTRUMENTS

(71) Applicant: Tactual Labs Co., New York, NY (US)

(72) Inventor: Braon Moseley, Round Rock, TX (US)

(73) Assignee: Tactual Labs Co., New York, NY (US)

(*) Notice: Subject to any disclaimer, the term of this patent is extended or adjusted under 35 U.S.C. 154(b) by 0 days.

(21) Appl. No.: 16/440,571

(22) Filed: Jun. 13, 2019

(65) Prior Publication Data

US 2019/0384456 A1     Dec. 19, 2019

Related U.S. Application Data

(60) Provisional application No. 62/684,311, filed on Jun. 13, 2018.

(51) Int. Cl.
*G06F 3/044* (2006.01)
*G06F 3/0488* (2013.01)

(52) U.S. Cl.
CPC ........ *G06F 3/0446* (2019.05); *G06F 3/04883* (2013.01); *G06F 2203/04106* (2013.01)

(58) Field of Classification Search
CPC .............. G06F 3/0446; G06F 3/04883; G06F 2203/04106; G06F 3/0416; G06F 3/041; G06F 1/1643; G06F 3/0488; G06F 3/1454; G09G 3/002; G09G 5/003; G09G 5/14; G09G 2340/0442; G09G 2340/14; G09G 2340/145; G09G 2360/18; G09G 2370/042; G09G 2370/12; G09G 2370/16; G09G 2370/20
See application file for complete search history.

(56) References Cited

U.S. PATENT DOCUMENTS

| | | | | |
|---|---|---|---|---|
| 6,353,193 B1* | 3/2002 | Atwood | ................ | G06F 3/033 178/18.01 |
| 8,344,738 B2* | 1/2013 | Kouno | ................ | G06F 3/044 178/18.06 |
| 8,482,539 B2* | 7/2013 | Ogawa | ................ | G06F 3/03545 178/18.01 |
| 2016/0299585 A1* | 10/2016 | Lee | ................ | G06F 3/0416 |
| 2017/0038896 A1* | 2/2017 | Lee | ................ | G06F 3/04883 |
| 2017/0242647 A1* | 8/2017 | Nakamori | ................ | G06F 3/147 |
| 2018/0235017 A1* | 8/2018 | Sakamoto | ................ | G06F 3/041 |
| 2018/0239486 A1* | 8/2018 | Hikichi | ................ | G06F 3/0482 |
| 2019/0033991 A1* | 1/2019 | Shirai | ................ | B43L 1/00 |
| 2019/0064946 A1* | 2/2019 | Saito | ................ | G06F 3/0346 |
| 2019/0265809 A1* | 8/2019 | Shirai | ................ | G06F 3/046 |
| 2019/0317615 A1* | 10/2019 | Forlines | ................ | G06F 3/0383 |

* cited by examiner

*Primary Examiner* — Chad M Dicke
(74) *Attorney, Agent, or Firm* — Adam B. Landa

(57) ABSTRACT

A whiteboard or other surface has sensors located with respect to the whiteboard or opaque surface so that interaction with the whiteboard or other surface with a writing implement is detected by the sensors located beneath the surface. The electrical properties of the inks interact with the signals transmitted and received by the conductors. These changes are measured and used to reproduce marks made by the writing implements, to store the marks made for later reproduction, or to display contemporaneously with the writing upon the surface.

18 Claims, 4 Drawing Sheets

|     | RX1   | RX2   | RX3   | RX4   |
|-----|-------|-------|-------|-------|
| TX1 | (1,1) | (1,2) | (1,3) | (1,4) |
| TX2 | (2,1) | (2,2) | (2,3) | (2,4) |
| TX3 | (3,1) | (3,2) | (3,3) | (3,4) |
| TX4 | (4,1) | (4,2) | (4,3) | (4,4) |

FIG. 2

SENSING OF MULTIPLE WRITING INSTRUMENTS

This Application claims the benefit of U.S. Provisional Application Ser. No. 62/684,311, filed Jun. 13, 2018, the contents of which are herein incorporated by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems relate in general to the field of user input, and in particular to devices sensitive to the use of various input styluses and touch.

BRIEF DESCRIPTION OF THE DRAWINGS

Objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Although example embodiments and associated data are disclosed for the purpose of illustrating the invention, other embodiments and associated data will be apparent to a person of skill in the art, in view of this disclosure, without departing from the scope and spirit of the disclosure herein.

FIG. 2 is a diagram illustrating the detection of ink by rows of transmitting conductors and columns of receiving conductors.

DETAILED DESCRIPTION

Figure 1:
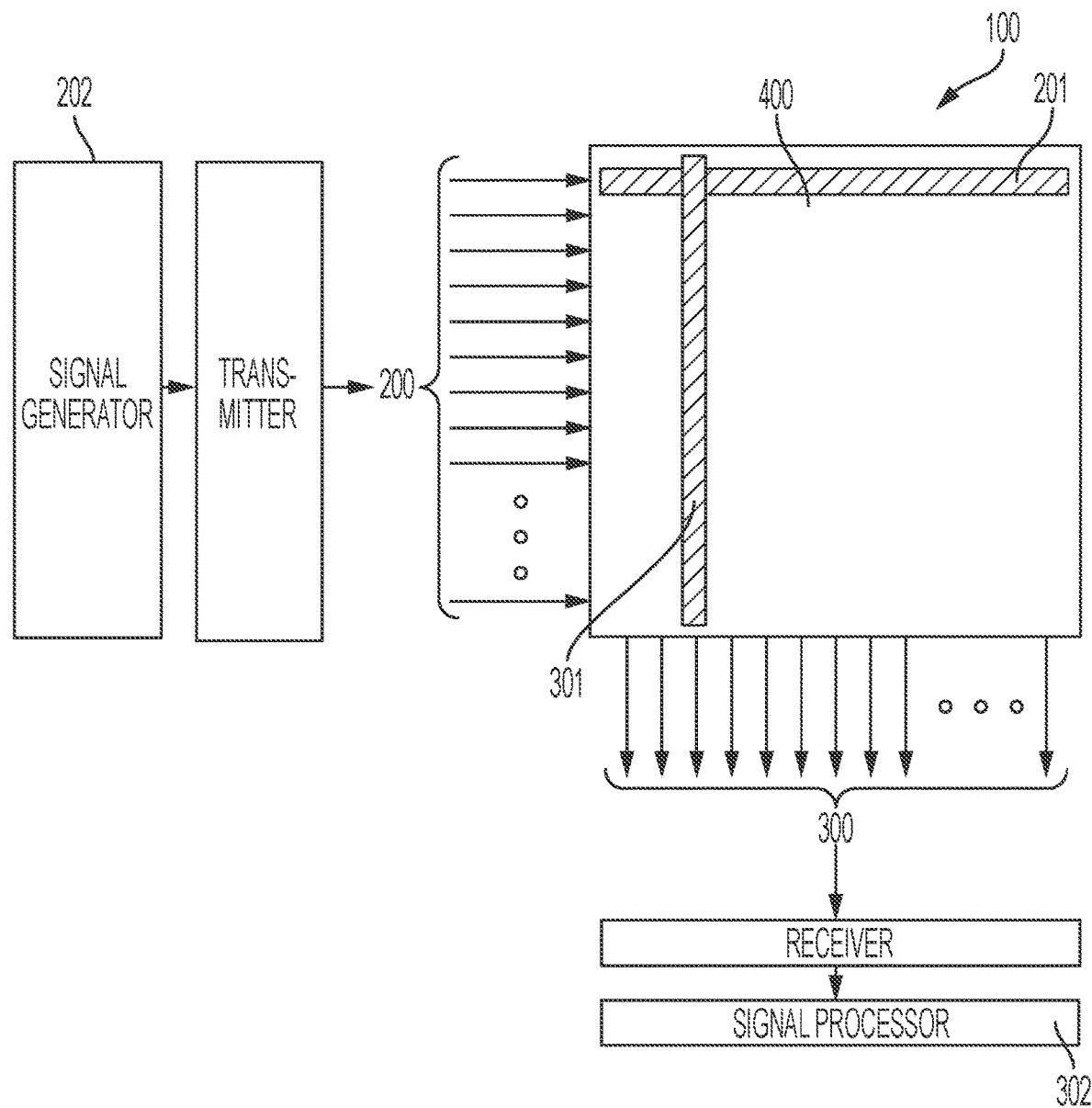
FIG. 1 is a schematic of a sensor used for the detection of touch.

In various embodiments, the present disclosure is directed to systems (e.g., objects, panels or keyboards) sensitive to touch events, such as, but not limited to, hover, contact and pressure and their applications in real-world, artificial reality, virtual reality and augmented reality settings. It will be understood by one of ordinary skill in the art that the disclosures herein apply generally to all types of systems using fast multi-touch sensors to detect hover, contact and pressure. In an embodiment, the present system and method can be applied to touch event panels and display surfaces, including, but not limited to smart boards, smart pads and interactive displays.

Throughout this disclosure, the terms "touch", "touches", "touch event", "event", "contact", "contacts", "hover", or "hovers" or other descriptors may be used to describe events or periods of time in which a key, key switch, user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the term "hover", the sensor may be tuned to allow for the detection of "touches" that are hovering at a distance above the touch surface or otherwise separated from the sensor device and causes a recognizable change, despite the fact that the conductive or capacitive object, e.g., a stylus or pen, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which is a "touch", "touch event" or "event". Generally, as used herein, the word "hover" refers to non-contact touch events or touch, and as used herein the term "hover" is one type of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The presently disclosed systems and methods involve principles related to and for designing, manufacturing and using capacitive based sensors, and particularly capacitive based sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, interactions are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosures of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

FIG. 1 illustrates certain principles of a fast multi-touch sensor 100 in accordance with an embodiment. Transmitter 200 transmits a different signal, generated by signal generator 202, into each of the row conductors 201 of the surface 400. The signals are designed to be "orthogonal", i.e., separable and distinguishable from each other. A receiver 300 is attached to each column conductor 301 and has operatively connected thereto a signal processor 302. The row conductors 201 and the column conductors 301 are conductors/antennas that are able to transmit and/or receive signals. The receiver 300 is designed to receive any of the transmitted signals, or an arbitrary combination of them, with or without other signals and/or noise, and to individually determine a measure, e.g., a quantity for each of the orthogonal transmitted signals present on that column conductor 301. The sensor 100 comprises a series of row conductors 201 and column conductor conductors 301 (not all shown), along which the orthogonal signals can propagate. In an embodiment, the row conductors 201 and column conductors 301 are arranged such that a touch event will cause a change in coupling between at least one of the row conductors 201 and at least one of the column conductors 301. In an embodiment, a touch event will cause a change in the amount (e.g., magnitude) of a signal transmitted on a row conductor 201 that is detected in the column conductor 301. In an embodiment, a touch event will cause a change in the phase of a signal transmitted on a row conductor 201 that is detected on a column conductor 301. Because the sensor 100 ultimately detects a touch event due to a change in the coupling, it is not of specific importance, except for reasons that may otherwise be apparent to a particular embodiment, the type of change that is caused to the touch-related coupling by a touch. As discussed above, the touch, or touch event does not require a physical touching, but rather an event that affects the coupled signal. In an embodiment the touch or touch event does not require a physical touching, but rather an event that affects the coupled signal in a repeatable or predictable manner.

With continued reference to FIG. 1, in an embodiment, generally, the result of a touch event in the proximity of both a row conductor 201 and column conductor 301 causes a change in the signal that is transmitted on a row conductor 201 as it is detected on a column conductor 301. In an embodiment, the change in coupling may be detected by comparing successive measurements on the column conductor 301. In an embodiment, the change in coupling may be detected by comparing the characteristics of the signal transmitted on the row conductor 201 to a measurement made on the column conductor 301. In an embodiment, a change in coupling may be measured both by comparing successive measurements on the column conductor 301 and by comparing known characteristics of the signal transmitted on the row conductor 201 to a measurement made on the column conductor 301. More generally, touch events cause, and thus correspond to, measurements of the signals on the column conductors 301. Because the signals on the row conductors 201 are orthogonal, multiple row signals can be coupled to a column conductor 301 and distinguished by the receiver 300. Likewise, the signals on each row conductor 201 can be coupled to multiple column conductors 301. For each column conductor 301 coupled to a given row conductor 201 (and regardless of how touch affects the coupling between the row conductor and column conductor), the signals measured on the column conductor 301 contain information that will indicate which row conductors 201 are being touched simultaneously with that column conductor 301. The magnitude or phase shift of each signal received is generally related to the amount of coupling between the column conductor 301 and the row conductor 201 carrying the corresponding signal, and thus, may indicate a distance of the touching object to the surface, an area of the surface covered by the touch and/or the pressure of the touch.

In various implementations of a touch event enabled device, physical contact with the row conductors 201 and/or column conductors 301 is unlikely or impossible as there may be a protective barrier between the row conductors 201 and/or column conductors 301 and the finger or other object of touch. Moreover, generally, the row conductors 201 and column conductors 301 themselves are not in physical contact with each other, but rather, placed in a proximity that allows signal to be coupled there-between, and that coupling changes with touch. Generally, the row conductor-column conductor coupling results not from actual contact between them, nor by actual contact from the finger or other object of touch, but rather, by the effect of bringing the finger (or other object) into proximity—which proximity results in a change of coupling, which effect is referred to herein as touch.

In an embodiment, the orientation of the row conductors 201 and column conductors 301 may vary as a consequence of a physical process, and the change in the orientation (e.g., movement) of the row conductors 201 and/or column conductors 301 with respect to one-another may cause a change in coupling. In an embodiment, the orientation of a row conductor 201 and a column conductor 301 may vary as a consequence of a physical process, and the range of orientation between the row conductor 201 and column conductor 301 include ohmic contact, thus in some orientations within a range a row conductor 201 and column conductor 301 may be in physical contact, while in other orientations within the range, the row conductor 201 and column conductor 301 are not in physical contact and may have their coupling varied. In an embodiment, when a row conductor 201 and column conductor 301 are not in physical contact their coupling may be varied as a consequence of moving closer together or further apart. In an embodiment, when a row conductor 201 and column conductor 301 are not in physical contact their coupling may be varied as a consequence of grounding. In an embodiment, when a row conductor 201 and column conductor 301 are not in physical contact their coupling may be varied as a consequence of materials translated within the coupled field. In an embodiment, when a row conductor 201 and column conductor 301 are not in physical contact their coupling may be varied as a consequence of a changing shape of the row conductor 201 or column conductor 301, or an antenna associated with the row conductor or column conductor.

The nature of the row conductors 201 and column conductors 301 is arbitrary and the particular orientation is variable. Indeed, the terms row conductor 201 and column conductor 301 are not intended to refer to a square grid, but rather to a set of conductors upon which signal is transmitted (rows) and a set of conductors onto which signal may be coupled (columns). The notion that signals are transmitted on row conductors 201 and received on column conductors 301 itself is arbitrary, and signals could as easily be transmitted on conductors arbitrarily designated columns and received on conductors arbitrarily named rows, or both could arbitrarily be named something else. Further, it is not necessary that row conductors 201 and column conductors 301 be in a grid. Other shapes are possible as long as a touch event will affect a row-column coupling. For example, some of the conductors could be in concentric circles and some of the conductor could be spokes radiating out from the center. And neither the "rows conductors" nor the "column conductors" need to follow any geometric or spatial pattern, thus, for example, the keys on a keyboard could be arbitrarily connected to form row conductors 201 and column conductors 301 (related or unrelated to their relative positions). Moreover, an antenna may be used as a row conductor 201 (e.g., having a more defined shape than a simple conductor wire such as for example a row made from ITO). For example an antenna may be round or rectangular, or have substantially any shape, or a shape that changes. An antenna used as a row conductor 201 may be oriented in proximity to one or more conductors, or one or more other antennas that act as column conductors 301. In other words, in an embodiment, an antenna may be used for signal transmission and oriented in proximity to one or more conductors, or one or more other antennas that are used to receive signals. A touch will change the coupling between the antenna used for signal transmission and the signal used to receive signals.

It is not necessary for there to be only two types signal propagation channels: instead of row conductors 201 and column conductors 301, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. It is also contemplated that the signal propagation channels can simultaneously support transmitters and receivers—provided that the signals transmitted are orthogonal, and thus separable, from the signals received. Three or more types of antenna or conductors may be used rather than just "rows" and "columns." Many alternative embodiments are possible and will be apparent to a person of skill in the art after considering this disclosure.

It is likewise not necessary for there to be only one signal transmitted on each transmitting media. In an embodiment, multiple orthogonal signals are transmitted on each row. In an embodiment, multiple orthogonal signals are transmitted on each transmit antenna.

Returning briefly to FIG. 1, as noted above, in an embodiment, the sensor 100 is operably connected to a touch surface 400 and comprises a series of row conductors 201 and column conductors 301, along which signals can propagate. As discussed above, the row conductors 201 and column conductors 301 are oriented so that, when they are not being touched the signals are coupled differently than when they are being touched. The change in signal coupled between them may be generally proportional or inversely proportional (although not necessarily linearly proportional) to the touch such that touch is measured as a gradation, permitting distinction between more touch (i.e., closer or firmer) and less touch (i.e., farther or softer)—and even no touch.

A receiver 300 is attached to each column conductor 301, which has a signal processor 302 operatively connected thereto. The receiver 300 is designed to receive the signals present on the column conductors 301, including any of the orthogonal signals, or an arbitrary combination of the orthogonal signals, and any noise or other signals present. Generally, the receiver is designed to receive a frame of signals present on the column conductors 301, and to identify the columns providing signal. A frame of signals is received during an integration period or sampling period. In an embodiment, the signal processor 302 associated with the receiver data may determine a measure associated with the quantity of each of the orthogonal transmitted signals present on that column conductor 301 during the time the frame of signals was captured. In this manner, in addition to identifying the row conductors 201 in touch with each column conductor 301, the receiver can provide additional (e.g., qualitative) information concerning the touch. In general, touch events may correspond (or inversely correspond) to the received signals on the column conductors 301. For each column conductor 301, the different signals received thereon indicate which of the corresponding row conductors 201 is being touched simultaneously with that column conductor 301. In an embodiment, the amount of coupling between the corresponding row conductor 201 and column conductor 301 may indicate, e.g., the area of the surface covered by the touch, the pressure of the touch, etc. In an embodiment, a change in coupling over time between the corresponding row conductor 201 and column conductor 301 indicates a change in touch at the intersection of the two.

In an embodiment, a mixed signal integrated circuit comprises signal generator, transmitter, receiver and signal processor. In an embodiment, the mixed signal integrated circuit is adapted to generate one or more signals and send the signals to transmit antennas. In an embodiment, the mixed signal integrated circuit is adapted to generate a plurality of frequency-orthogonal signals and send the plurality of frequency-orthogonal signals to the transmit antenna. In an embodiment, the mixed signal integrated circuit is adapted to generate a plurality of frequency-orthogonal signals and send one or more of the plurality of frequency-orthogonal signals to each of a plurality of row conductors. In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 KHz to 200 KHz. The frequency spacing between the frequency-orthogonal signals should be greater than or equal to the reciprocal of an integration period (i.e., the sampling period).

In an embodiment, the signal processor of a mixed signal integrated circuit (or a downstream component or software) is adapted to determine at least one value representing each frequency orthogonal signal transmitted to a row conductor. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to touch. In other words, the measure corresponding to signal strength in a given bin would change as a result of a touch event.

When dealing with a touch panel or display employing sensors, such as described above, many factors come into play that governs the detection of signals and consequently touch events. The crosstalk between row conductors and column conductors plays a role in determining touch events. The coupling magnitude and the phase in any region of the display or the sensor also plays a role in determining the touch events. For example, the type of conductor used for the row conductors and column conductors plays a factor in determining touch events. The mutual capacitance in the near field between a row conductor and another row conductor also plays a factor in determining touch events. The mutual capacitance between a row conductor and another column conductor plays a factor in determining touch events. The mutual capacitance between a column conductor and another column conductor plays a factor in determining touch events. The mutual inductance in the near field between a row conductor and another row conductor plays a factor in determining touch events. The mutual inductance between a row conductor and another column conductor plays a factor in determining touch events. The mutual inductance between a column conductor and another column conductor plays a factor in determining of touch events. The dielectric and permeability characteristics of the materials between, on, and near row conductors and column conductors additionally play a factor in the determination of touch events.

The signal processor is able to analyze the received signals and detect small changes in the crosstalk/coupling due to the various factors that impact the sensor. At each sensed row conductor/column conductor coupling that is greater than the absolute magnitude of a driven frequency or frequencies of signals can be detected and analyzed by the signal processor. The real component of the received signal of a driven frequency or frequencies of a signal can be detected and analyzed by the signal processor. The imaginary component of the received signal of a driven frequency or frequencies of the signals can be detected and analyzed by the processor. The phase relationship with respect to the real and imaginary components of a driven frequency or frequencies of the coupled signal can increase, decrease, or stay the same with respect to each orthogonal frequency divided separable frequency. These changes can be detected and analyzed by the signal processor.

These detectable changes in received signal components for coupling are repeated for every unique sensed row conductor/column conductor coupling for the entire sensor. Mathematical comparisons can then be made between any two or more sensed row conductor/column conductor coupling, amongst any region or neighborhood of nearby sensed row conductor/column conductor coupling, and/or amongst any two or more such regions.

The information space for a single sensed row conductor/column conductor coupling is dense and therefore the permutation of information space amongst one sensed row conductor/column conductor coupling or region with respect to another unique and separate sensed row conductor column conductor coupling or region is quite large. Any change in the relationship of the factors establishing one or more signal properties at a given sensed row conductor/column conductor coupling is detectable. For example, if the conductivity of the material at or near a sensed row conductor/column conductor coupling changed (due to water absorption for example), the change would be detected at that given sensed row conductor/column conductor coupling.

If the change in the relationship of the factors establishing one or more signal properties change in a region of sensed row conductor/column conductor coupling, for example, in the conductivity change due to the water absorption example mentioned above, then such changes are additionally detectable at or near the region of change in the sensor for each sensed row/column coupling and amongst the individual sensed row conductor/column conductor couplings.

FIG. 2 is a simple diagram of row conductors and column conductors that is used herein to discuss the concepts disclosed herein. The row conductors are labeled with TX1-TX4, the column conductors are labeled RX1-RX4. Row conductors TX1-TX4 are adapted for transmitting signals. Column conductors RX1-RX4 are adapted for receiving signals. It should be understood, as mentioned above, that labeling one set of conductors the transmitting conductors and one set of conductors the receiving conductors is for convenience only.

Still referring to FIG. 2, for example, if the conductivity increases between sensed row conductor/column conductor (TX1, RX3) and sensed row conductor/column conductor (TX2, RX2), then not only are signal parameters of TX1 with respect to RX3 altered, but additionally the signal parameters of TX2 with respect to RX3 and also TX1 with respect to RX2 altered. That is to say conductivity impacting one set of row conductor/column conductor pair further impacts the signals transmitted and received on nearby row and column conductors.

Figure 3:
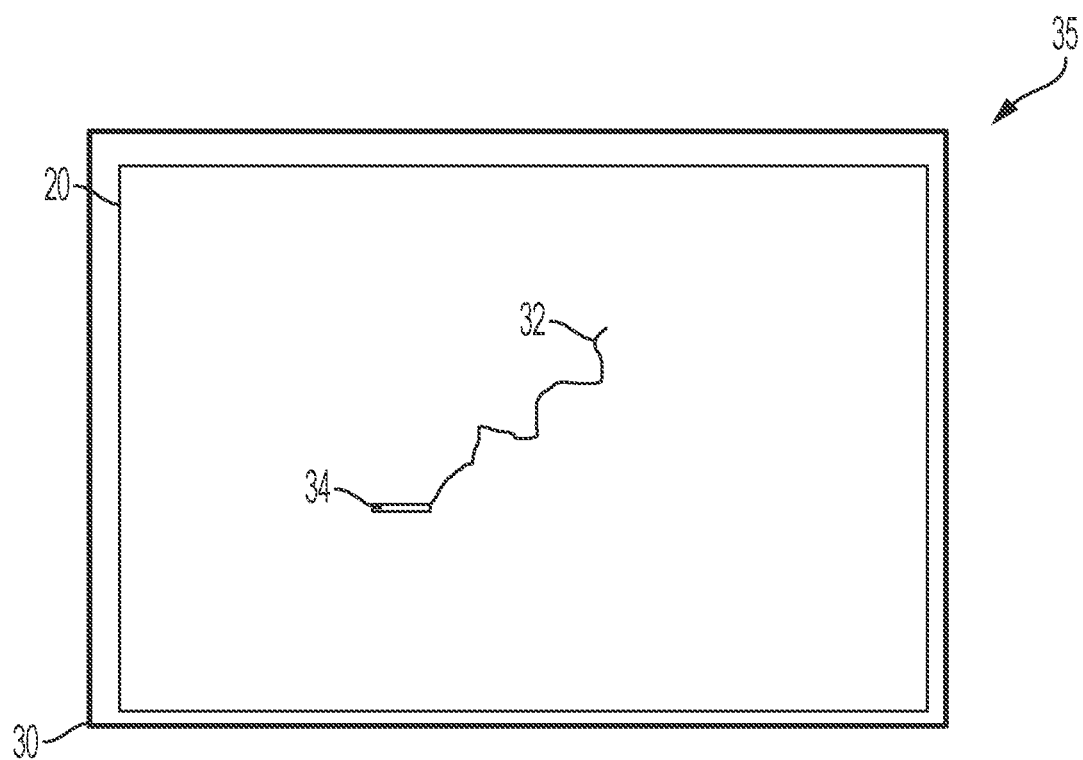
FIG. 3 shows a whiteboard and ink having a touch event panel embedded within the whiteboard.

Referring now to FIG. 3, using the insights gained regarding sensors and manner in which signals behave during touch events, an off-the-shelf "dry erase" type whiteboard marker can be used in conjunction with a whiteboard system 35 that has a touch panel 20 and whiteboard 30 that is placed on top of the touch panel 20. In an embodiment, the touch panel 20 is embedded within the whiteboard 30. In an embodiment, a whiteboard coating is applied to a touch panel 20. The touch panel 20 employs a sensor or sensors that implement the conductors and signal functionality and analysis discussed above.

In an embodiment, the whiteboard 30 is able to function with off-the-shelf markers. The ink inside the marker 34, which in an embodiment is a dry erase marker, is saturated with a liquid, such as alcohol or a similar liquid, which transports ink to the tip of the marker via capillary action. The liquid used in the markers 34 is used in combination with the ink in order to draw upon the outer surface of the whiteboard 30. The outer surface of the whiteboard 30 is the surface of the whiteboard 30 that faces the user of the whiteboard system 35 and is that surface which is drawn or written upon by a user. When the combined liquid and ink is used in the dry erase markers 34 and deposited on a surface of the whiteboard 30 a region, the thin material deposited has specific dielectric, conductive, and other electrically reactive properties formed on the surface of the whiteboard 30. This region of material deposited on the whiteboard 30 forms the mark 32 on the surface of the whiteboard 30.

The electrically reactive properties of the mark 32 have an impact on the capacitive properties of conductor of the touch panel 20 and impact what is ultimately measured. These measurements are then used to extract information regarding what is drawn upon or written on the whiteboard 30. This information conveyed by the mark 32 and by other touch events that occur during the depositing of the mark 32 can be reproduced, stored or transmitted by the software and processor operatively connected to or formed as part of the touch panel 20. Additionally, touch events other than those caused by a marker or writing utensil can be sensed by the touch panel 20 and used to implement commands or other behavior by the touch panel 20.

In an embodiment, the mark 32 is displayed on the whiteboard 30. The mark 32 can be seen by those looking at the whiteboard 30. Furthermore, the information conveyed by the mark 32 can also be processed by the touch panel 20. In an embodiment, the mark 32 is displayed at another location, such as a laptop, a smart screen, or another classroom having a similar whiteboard system 35. In an embodiment, the mark 32 is stored for later reference, after the touch event and placement of the mark 32 has been detected and analyzed by the signal processor 302. In an embodiment, all marks 32 placed on the whiteboard 30 may be stored for future reference. In an embodiment, marks placed on the whiteboard 30 may be reproduced on the whiteboard after being retrieved from storage.

In an embodiment, the whiteboard 30 is a thin whiteboard or whiteboard compatible dry erase surface added as a layer to touch panel 20. The touch panel 20 has one or more sensors embedded therein that are adapted to take measurements and analyze measurements from the received frequency orthogonal signals. As the user draws or writes with the marker 34, the tip of the marker 34 is in physical contact with the outer surface of the whiteboard 30. As the user draws with the marker 34, the sensed row conductor/column conductor couplings are disturbed (changed) by the presence of the marker 34. These changes in signal parameters are processed by the signal processor and a unique point on the surface of the touch sensor can be identified corresponding to the proximate location of the tip of the marker 34. Characteristics of the markings made, such as the thickness of the markings, pressure and movement of the markings can be determined by the touch panel 20.

Additionally, the marker 34 can deposit a region of thin dry erase ink plus carrier liquid corresponding to the path of the marker 34. The mark 32 is shown on the whiteboard 30. Because this newly deposited material alters the signal parameters of sensed row conductor/column conductor couplings, the signal parameters of the neighboring region of sensed row conductor/column conductor couplings and the signaling parameters amongst sensed row conductor/column conductor regions, the deposited material from the marker 34 can be separably detected. This permits there to be an accurate depiction and record of the application of the marker 34 to the whiteboard 30.

In an embodiment, the sensors form the touch panel that exists underneath the whiteboard. The touch panel can exist underneath a thin layer of opaque whiteboard material. When a user, writes on the surface of the whiteboard with a marker, such as a dry-erase marker, the ink will appear on the surface of the whiteboard. A user can write and erase as normal, but the sensors will detect and store the interactions with the whiteboard. Thus a record of the conveyance of information to the whiteboard can be saved and stored for future reference or transmitted to different screens locally or at a remote location. Because the sensors can detect the interaction with the whiteboard and the ink, the removal of the ink can also be sensed. Furthermore, the sensors can also detect pressure and thus the movement of an eraser across the surface of the whiteboard can be detected and the corresponding erasure movement can be processed by the whiteboard system.

In an embodiment, the markings made on the whiteboard can be stored elsewhere. In an embodiment, the whiteboard is made of material that can change opacity (i.e. be opaque during a first use and transparent during a second use). In an embodiment, the whiteboard is changed to a standard display surface by polarizing the material forming the surface layer, thereby forming both a whiteboard and display panel and being capable of functioning as both. In an embodiment, the whiteboard is changed to a blackboard type surface. In an embodiment, the whiteboard is changed to a solid opaque surface.

In an embodiment, the dry erase marker deposited material can change its electrically reactive properties as the carrier liquid out gasses, leaving only the ink material in contact with the whiteboard. That is to say the electric properties of the ink (e.g. capacitance, resistance, etc.) can alter as it comes into contact with the material of the whiteboard and/or the ambient air. For example the ink can oxidize when it is exposed to the air.

In an embodiment, the dry erase ink plus carrier liquid material is minimally electrically reactive when it is newly deposited. In an embodiment, the dry erase ink plus carrier liquid material is maximally electrically reactive when it is newly deposited. In an embodiment, the dry erase ink plus carrier liquid material is minimally electrically reactive when the carrier liquid has out-gassed. "Out-gassing" is the fumes, etc. that are typically emitted by a marker when used. In an embodiment, the dry erase ink-plus carrier liquid material is maximally electrically reactive when the carrier liquid has out-gassed. In an embodiment, the dry erase ink plus carrier liquid material is designed to out-gas faster. In an embodiment, the dry erase ink plus carrier liquid material is designed to out-gas slower.

In an embodiment, dry erase marker liquids corresponding to different colors can each carry a different combination of electrically reactive properties. By each of the dry erase liquids having a different combination of electrically reactive properties they can be detected and identified separately by the processor, thereby being able to be sensed and stored by the touch panel. For example a red ink can have a first set of electrical properties that interact with the conductors and transmitted signals in particular fashion so that the touch panel interprets the received signals as red and can display and/or store the received data as such. A black in can have a second set of electrical properties that interact with the conductors and transmitted signals in a particular fashion so that the touch panel interprets the received signals as black and can display and/or store the received data as such.

Figure 4:
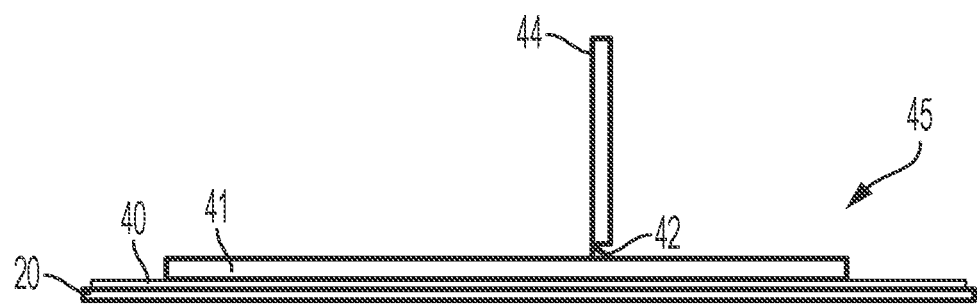
FIG. 4 shows a paper and pencil combination used with a touch event panel.

Turning to FIG. 4, shown is an embodiment where instead of a whiteboard there is an opaque surface 40 that is used. Note that while an "opaque surface" is referred to it is contemplated that a transparent surface may also be used in conjunction with the opaque surface 40, or in some instances replace the opaque surface 40. Similarly, a translucent surface may be used with or in place of the totally opaque surface. The opaque surface 40 can be placed on any table or surface. In an embodiment, the opaque surface is the surface of a table. In an embodiment the opaque surface is an easel or other drawing surface. In an embodiment, the opaque surface is the surface of a desk.

Underneath the opaque surface 40 is the touch panel 20. The touch panel 20 functions in the same manner as the touch panel 20 discussed above. However, instead of a dry erase marker a writing utensil 44 is used. The writing utensil 44 can be a pencil, pen, crayon, marker, etc. The writing utensil 44 is used to write or draw on a piece of paper 41 that is placed on the opaque surface 40.

In the embodiment shown in FIG. 4, instead of the electrical properties of the ink of the marker, the electrical properties of the graphite in the pencil or the ink in the pen are used in order to convey information to the touch panel 20. Additionally, the pressure and movement of the writing utensil 44 that is detected by the touch panel 20. The information detected can be stored or reproduced elsewhere for later manipulation.

In an embodiment, a user can write on a desk having an opaque surface and touch panel and store the information for later use or display the information on a display screen elsewhere, for example at the front of a classroom or in other classrooms. In an embodiment, a user can write on a table in a restaurant (the opaque surface) having a touch panel embedded therein or having the opaque surface placed on top of it and the user can write down orders, etc.

In an embodiment, the presence of a conductive material can be ascertained by the touch panel. If the conductive material is not intended to be present on the touch panel, the touch panel can determine its presence and mitigate its presence on the touch panel by compensating for its impact. Therefore the presence of conductive materials located on the touch panel can be compensated for.

An embodiment of the disclosure is a device comprising a touch panel comprising a first plurality of conductors operably connected to a signal generator, wherein the signal generator is adapted to generate a plurality of frequency orthogonal signals, wherein the plurality of frequency orthogonal signals are transmitted on each of the first plurality of conductors, a second plurality of conductors operably connected to a signal processor, wherein measurements of the plurality of frequency orthogonal signals received on the second plurality of conductors are processed by the signal processor; and a whiteboard surface disposed on top of the touch panel, wherein the whiteboard surface is adapted to receive and reproduce markings made on the whiteboard surface using a marker, wherein the markings made on the whiteboard surface have properties that affect the measurements of the plurality of frequency orthogonal received on the second plurality of conductors of the touch panel, wherein processed measurements of the markings are stored and/or reproduced by the touch panel.

Another embodiment of the disclosure is a device comprising a touch panel comprising a first plurality of conductors operably connected to a signal generator, wherein the signal generator is adapted to generate a plurality of frequency orthogonal signals, wherein the plurality of frequency orthogonal signals are transmitted on each of the first plurality of conductors, a second plurality of conductors operably connected to a signal processor, wherein measurements of the plurality of frequency orthogonal signals received on the second plurality of conductors are processed by the signal processor; and an opaque surface disposed on top of the touch panel, wherein the opaque surface is adapted to receive and reproduce markings made on the opaque surface using a writing implement, wherein the markings made on the opaque surface have properties that affect the measurements of the plurality of frequency orthogonal received on the second plurality of conductors of the touch panel, wherein processed measurements of the markings are stored and/or reproduced by the touch panel.

While the invention has been particularly shown and described with reference to a preferred embodiment thereof, it will be understood by those skilled in the art that various changes in form and details may be made therein without departing from the spirit and scope of the invention.

The invention claimed is:

1. A device comprising:
a touch panel comprising a first plurality of conductors operably connected to a signal generator, wherein the signal generator is adapted to generate a plurality of frequency orthogonal signals, wherein the plurality of frequency orthogonal signals are transmitted on each of the first plurality of conductors, a second plurality of conductors operably connected to a signal processor, wherein measurements of the plurality of frequency orthogonal signals received on the second plurality of conductors are processed by the signal processor;
a whiteboard surface disposed on top of the touch panel, wherein the whiteboard surface is adapted to receive and reproduce markings made on the whiteboard surface using a marker, wherein the markings made on the whiteboard surface have properties that affect the measurements of the plurality of frequency orthogonal received on the second plurality of conductors of the touch panel; and
wherein the properties that affect the measurements of the plurality of frequency orthogonal signals have different electrically reactive properties, wherein different colors of markings have different electrically reactive properties and the touch panel is adapted to distinguish between the different colors of markings based on the different electrically reactive properties.

2. The device of claim 1, wherein the properties that affect the measurements of the plurality of frequency orthogonal signals have different electrical properties.

3. The device of claim 1, wherein the touch panel is adapted to determine the pressure of the marker on the whiteboard surface.

4. The device of claim 1, wherein the properties that affect the measurements of the plurality of frequency orthogonal signals are used by the touch panel to determine whether the markings are still present on the whiteboard surface.

5. The device of claim 1, wherein the touch panel is further adapted to transmit markings made on the whiteboard surface to a remote location.

6. The device of claim 1, wherein the touch panel is further adapted to determine touch events that occur on the whiteboard surface.

7. The device of claim 1, wherein the properties that affect the measurements of the plurality of frequency orthogonal signals have different electrical properties, the touch panel is adapted to distinguish between the placement of the markings on the whiteboard surface and the removal of the markings on the whiteboard surface.

8. The device of claim 1, wherein the touch panel is able to determine a thickness of the markings placed on the whiteboard surface.

9. The device of claim 1, wherein the touch panel is embedded within the whiteboard surface.

10. A device comprising:
a touch panel comprising a first plurality of conductors operably connected to a signal generator, wherein the signal generator is adapted to generate a plurality of frequency orthogonal signals, wherein the plurality of frequency orthogonal signals are transmitted on each of the first plurality of conductors, a second plurality of conductors operably connected to a signal processor, wherein measurements of the plurality of frequency orthogonal signals received on the second plurality of conductors are processed by the signal processor;
an opaque surface disposed on top of the touch panel, wherein the opaque surface is adapted to receive and reproduce markings made on the opaque surface using a writing implement, wherein the markings made on the opaque surface have properties that affect the measurements of the plurality of frequency orthogonal received on the second plurality of conductors of the touch panel; and
wherein the properties that affect the measurements of the plurality of frequency orthogonal signals have different electrically reactive properties, wherein different markings have different electrically reactive properties and the touch panel is adapted to distinguish between the different colors of markings based on the different electrically reactive properties.

11. The device of claim 10, wherein the properties that affect the measurements of the plurality of frequency orthogonal signals have different electrical properties.

12. The device of claim 10, wherein the touch panel is adapted to determine the pressure of the writing implement on the opaque surface.

13. The device of claim 10, wherein the properties that affect the measurements of the plurality of frequency orthogonal signals are used by the touch panel to determine whether the markings are still present on the opaque surface.

14. The device of claim 10, wherein the touch panel is further adapted to transmit markings made on the opaque surface to a remote location.

15. The device of claim 10, wherein the touch panel is further adapted to determine touch events that occur on the opaque surface.

16. The device of claim 10, wherein the properties that affect the measurements of the plurality of frequency orthogonal signals have different electrical properties, the touch panel is adapted to distinguish between the placement of the markings on the opaque surface and the removal of the markings on the opaque surface.

17. The device of claim 10, wherein the touch panel is able to determine a thickness of the markings placed on the opaque surface.

18. The device of claim 10, wherein the touch panel is embedded within the opaque surface.

* * * * *